(12) United States Patent
Debuisschert et al.

(10) Patent No.: US 6,430,206 B1
(45) Date of Patent: Aug. 6, 2002

(54) UNSTABLE OPTICAL CAVITY FOR LASER BEAM

(75) Inventors: Thierry Debuisschert, Orsay; Jean-Paul Pocholle, La Norville, both of (FR)

(73) Assignee: Thomson-CSF, Paris (FR)

( * ) Notice: Subject to any disclaimer, the term of this patent is extended or adjusted under 35 U.S.C. 154(b) by 126 days.

(21) Appl. No.: 09/612,957

(22) Filed: Jul. 10, 2000

(30) Foreign Application Priority Data

Jul. 9, 1999 (FR) .............................. 99 08955

(51) Int. Cl.$^7$ .......................... H01S 3/08; H01S 3/083
(52) U.S. Cl. ................................. 372/95; 372/92
(58) Field of Search ..................... 372/9, 10, 92, 372/93, 94, 95

(56) References Cited

U.S. PATENT DOCUMENTS

| | | | |
|---|---|---|---|
| 3,654,482 A | 4/1972 | Massey | 359/330 |
| 4,025,172 A * | 5/1977 | Freiberg | 359/859 |
| 4,267,524 A | 5/1981 | Paxton et al. | 372/95 |
| 5,077,750 A | 12/1991 | Pocholle et al. | 372/68 |
| 5,086,433 A | 2/1992 | Pocholle et al. | 372/20 |
| 5,088,096 A | 2/1992 | Pocholle et al. | 372/72 |
| 5,105,428 A | 4/1992 | Pocholle et al. | 372/24 |
| 5,123,025 A | 6/1992 | Papuchon et al. | 372/72 |
| 5,128,948 A | 7/1992 | Papuchon et al. | 372/21 |
| 5,138,628 A | 8/1992 | Pocholle et al. | 372/99 |
| 5,222,093 A | 6/1993 | Pocholle et al. | 372/72 |
| 5,243,617 A | 9/1993 | Pocholle et al. | 372/69 |
| 5,289,309 A | 2/1994 | Delacourt et al. | 359/328 |
| 5,311,540 A | 5/1994 | Pocholle et al. | 372/97 |
| 5,369,524 A | 11/1994 | Pocholle et al. | 359/345 |
| 5,375,131 A | 12/1994 | Pocholle et al. | 372/3 |
| 5,384,801 A | 1/1995 | Pocholle et al. | 372/43 |
| 5,444,571 A | 8/1995 | Debuisschert et al. | 359/566 |
| 5,483,374 A | 1/1996 | Tanuma | 359/328 |
| 5,546,222 A * | 8/1996 | Plaessmann et al. | 359/346 |
| 5,570,387 A | 10/1996 | Carriere et al. | 375/50 |
| 5,615,042 A | 3/1997 | Delacourt et al. | 359/338 |

FOREIGN PATENT DOCUMENTS

| | | |
|---|---|---|
| DE | 40 04 071 | 8/1991 |
| DE | 40 08 226 | 9/1991 |

* cited by examiner

*Primary Examiner*—Paul Ip
*Assistant Examiner*—Jeff Zahn
(74) *Attorney, Agent, or Firm*—Oblon, Spivak, McClelland, Maier & Neustadt, P.C.

(57) ABSTRACT

An unstable optical cavity for laser beams, having at least 3 deflection means for making a beam created in the cavity undergo at least three changes in direction so to form an optical ring path, and an optical magnification set disposed among the deflecting means. The at least 3 deflection means are prisms, each of which has an air-glass reflecting interface that provides one of the changes in direction by total reflection. A first of the at least 3 prims is positioned at an output of the cavity and has an air-glass reflecting interface with an insufficient size for a total reflection of the beam in the cavity, and remaining ones of the prisms have an air-glass reflecting interface with a sufficient size for a total reflection of the beam in the cavity.

16 Claims, 4 Drawing Sheets

UNSTABLE OPTICAL CAVITY FOR LASER BEAM

BACKGROUND OF THE INVENTION

The present invention relates to unstable optical cavities for laser beams, used especially in the field of laser cavities and optical parametrical oscillators.

These cavities are called unstable because a light ray circulating in these cavities moves away from the optical axis as and when it is being propagated. The external part of the beam circulating in the cavity is deliberately transmitted out of the cavity by an output mirror designed for this purpose. This external part is the useful beam.

The mirrors used in prior art optical cavities have limited resistance to flux. Indeed, the light flux that flows in these cavities tends to cause deterioration in the multidielectric treatment of the mirrors used for changes in direction.

The present invention is aimed at overcoming this drawback.

To obtain this goal, two methods were possible: either to find modes of multidielectric treatment that are more resistant or else to remove the need for such treatment. It is a second method that was explored in the context of the invention.

SUMMARY OF THE INVENTION

According to the invention, there is proposed an unstable optical cavity for laser beams, in which a beam is created. This cavity has an optical path known as a ring path with n changes in direction, where n is an integer greater than 2, to form the ring and comprising, in the optical path, an optical magnification set, n deflection means to make the beam created in the cavity undergo the n changes in direction, and an output, wherein the deflection means are n prisms each of which has an interface, called a reflecting interface, of the air-glass type that provides one of the changes in direction by total reflection and wherein n−1 prisms, called large prisms, have their reflecting interface with a sufficient size for the reflection, in the cavity, of the totality of the beam while one of the prisms, called an output prism, is positioned at the output and has its reflected interface with an insufficient size for the reflection, in the cavity, of the totality of the beam created in the cavity.

BRIEF DESCRIPTION OF THE DRAWINGS

The present invention will be understood more clearly and other characteristics shall appear from the following description and the appended figures, of which.

In the different figures, the corresponding elements are designated by the same references.

MORE DETAILED DESCRIPTION

Figure 1:
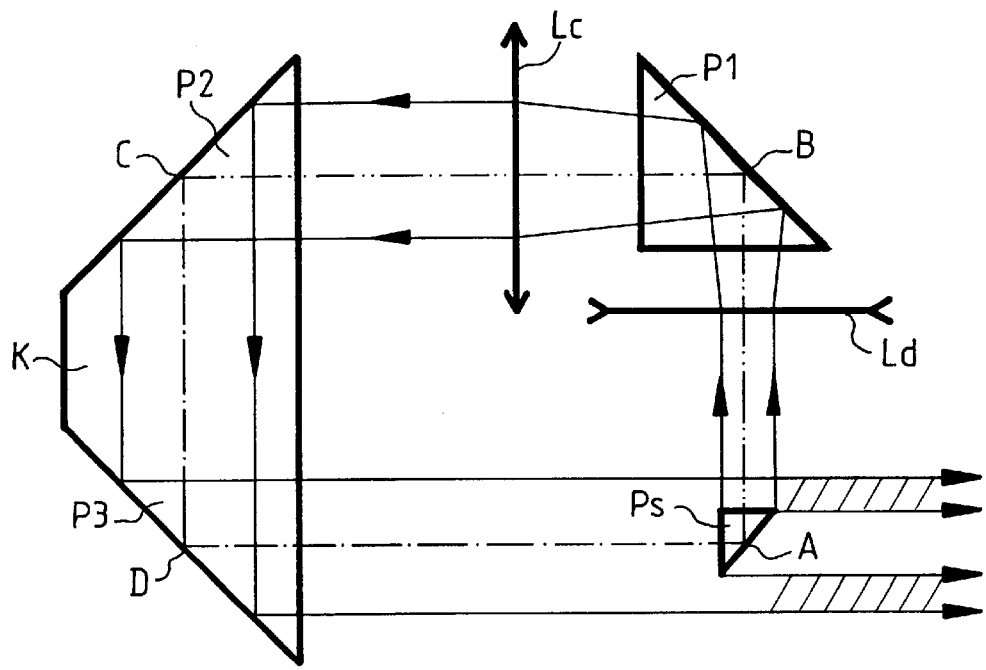
FIG. 1 is a drawing of a cavity according to the invention.

FIG. 1 is a sectional view of an unstable type of cavity. This cavity has a ring-shaped optical path, ABCD, shown in axial lines. It must be noted that the optical path is rectangular in the example described and that the ring-shaped optical paths are actually convex polygons.

FIG. 1 shows only the elements that play a role in guiding a laser beam in the cavity. The other elements, especially those that produce this laser beam, have not been drawn. This is in order to make the drawing clearer and facilitate the explanation and understanding of the invention.

The cavity according to FIG. 1 has four prisms Ps, P1 to P3 with each having one of their faces used in total reflection. The faces used in total reflection are respectively positioned at the four corners of the rectangle ABCD. The cavity also has an optical magnification set consisting of a divergent lens Ld and a convergent lens Lc respectively positioned in the sections AB and BC of the ring.

Figure 7:
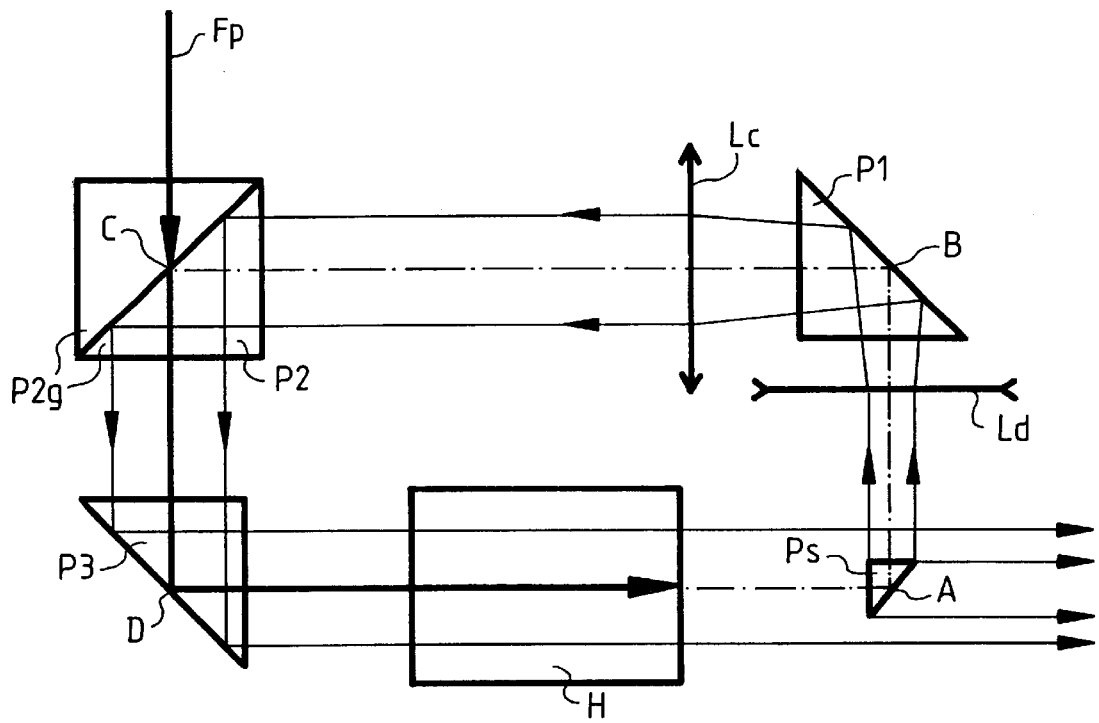

It must be noted that the prisms P2 and P3 are combined into a single optical block K in the example described but could also be distinct from one another as shall be seen in the embodiment according to FIG. 7.

The rim of the laser beam has been drawn in thin lines with arrow tips to show the direction of propagation of light.

The four prisms Ps, P1 to P3 are prisms with sections in the form of an isosceles right triangle. Their faces whose trace in FIG. 1 constitutes the two sides of the isosceles triangle are used respectively as input and output faces. Their face whose trace in FIG. 1 constitutes the hypotenuse of the isosceles rectangular triangle is the one used in total reflection. Naturally, since the prisms P2, P3 are combined in the optical block K, the output face of the prism P2 and the input face of the prism P3 are virtual faces but it all happens, in optical terms, as if they existed and formed two parallel faces separated by a strip with parallel faces made of the same material as the prisms.

The magnification unit Ld–Lc is positioned on either side of the prism P1: the divergent lens Ld converts the parallel ray laser beam, coming from the prism Ps, into a divergent beam that is deflected at right angles by the prism P1. Then the convergent lens Lc converts the divergent laser beam into a parallel ray beam. The magnification is equal to the ratio of the focal distance of the lens Lc to the focal distance of the lens Ld. The magnification unit Ld–Lc could be positioned differently in the optical path within the cavity, for example between the lenses P1 and P2 or P3 and Ps. It is generally preferable that the laser beam should be a parallel ray beam when it reaches the level of the prism Ps, since it is a part of this beam that comes out of the cavity at the output prism which constitutes the prism Ps. The output prism Ps, unlike the prisms P1 to P3, has a size insufficient for the reflection, in the cavity, of the totality of the laser beam that reaches its level. The prism Ps thus fulfills the role of a pupil and determines the section of the laser beam in the cavity. Only the light that it reflects is recycled in the cavity. The light that passes around the prism Ps is the output beam of the cavity. It has been identified by hatched lines in FIG. 1. As the case may be, if the beam were to be divergent at the output of the cavity, it could be converted into a parallel ray beam, for example by means of a convergent lens.

It must be noted that it is preferable, in the prisms, for the interfaces crossed by the beams to be given anti-reflection treatment without this being indispensable.

Figure 2:
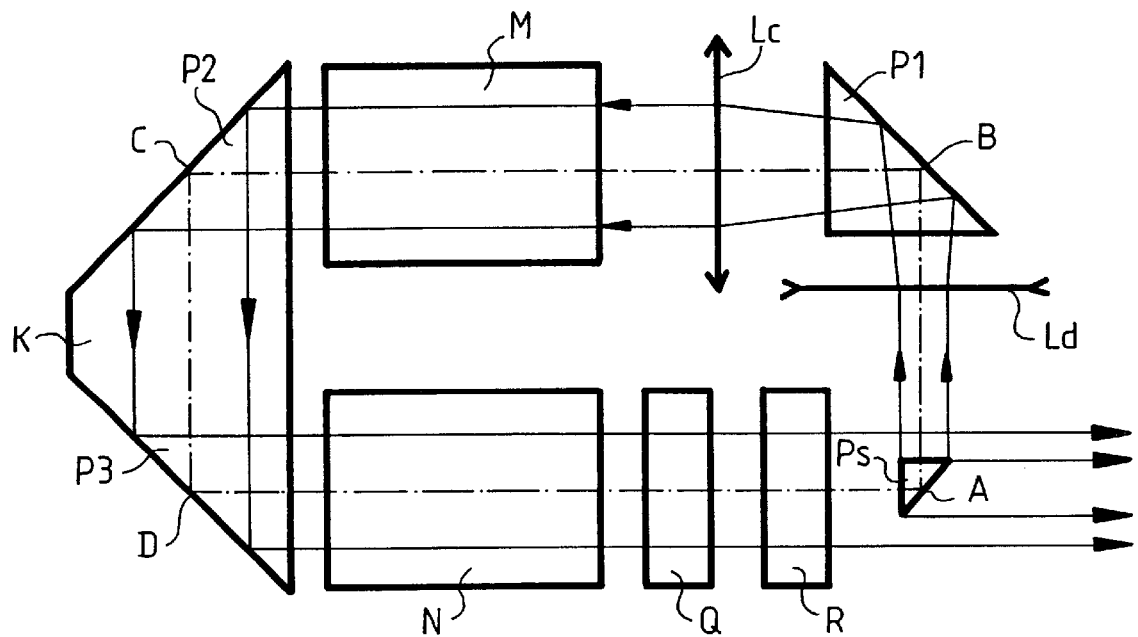
FIGS. 2 and 3 are drawings of the cavity according to FIG. 1 used as a laser cavity.

FIG. 2 gives a sectional view of the cavity according to FIG. 1 in an exemplary use as a laser cavity. For a use of this kind, a laser head with diodes, M, is inserted between the convergent lens Lc and the prism P2 while, between the prism P3 and the prism Ps, there are successively positioned a laser head with diodes, N, an activation device Q, called a Q-switch and a Faraday rotator R.

Figure 3:
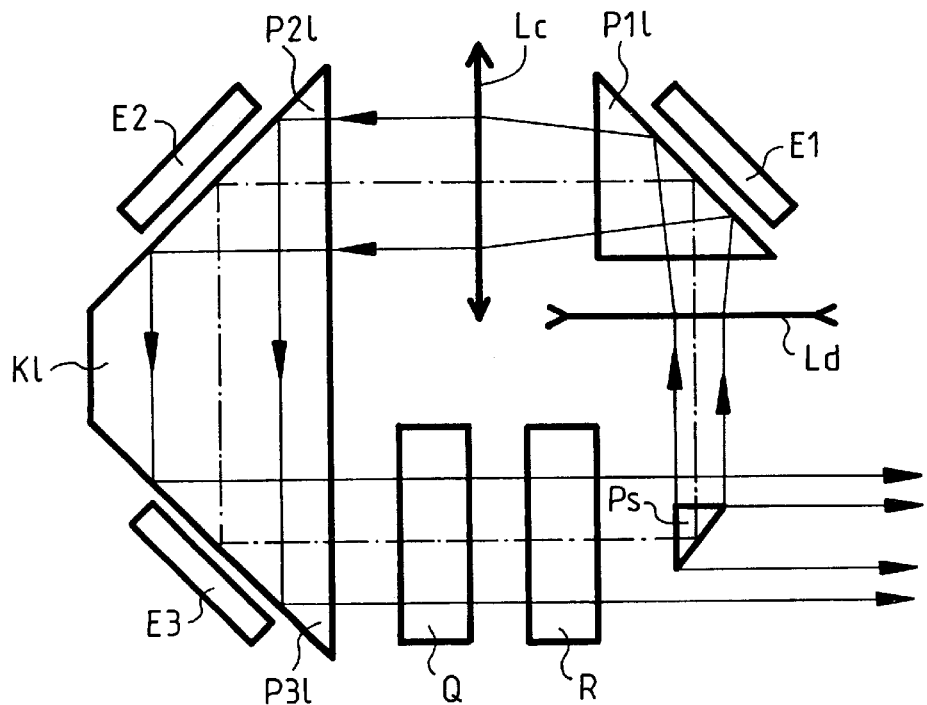

FIG. 3 relates to a variant in the laser cavity according to FIG. 2. In this variant, the laser heads M, N are replaced by laser heads associated with the prisms P1 to P3: the prism P1 and the optical unit K are made out of an active material, namely a laser material also called an amplifier material which, in the example described, is neodymium-doped yttrium garnet known under the reference Nd:YAG. To mark the difference between the materials used in the embodiments according to FIGS. 2 and 3, the references P1, K, P2, P3 have been respectively replaced by P1I, K1, P2I, P3I. A laser pumping operation is performed at the reflection faces of the prisms P1I, P2I and P3I respectively by three laser diode arrays E1, E2 and E3. As in the embodiment according to FIG. 2, an activation device Q and a Faraday rotator R are series-connected between the prisms P3 and Ps.

Figure 4:
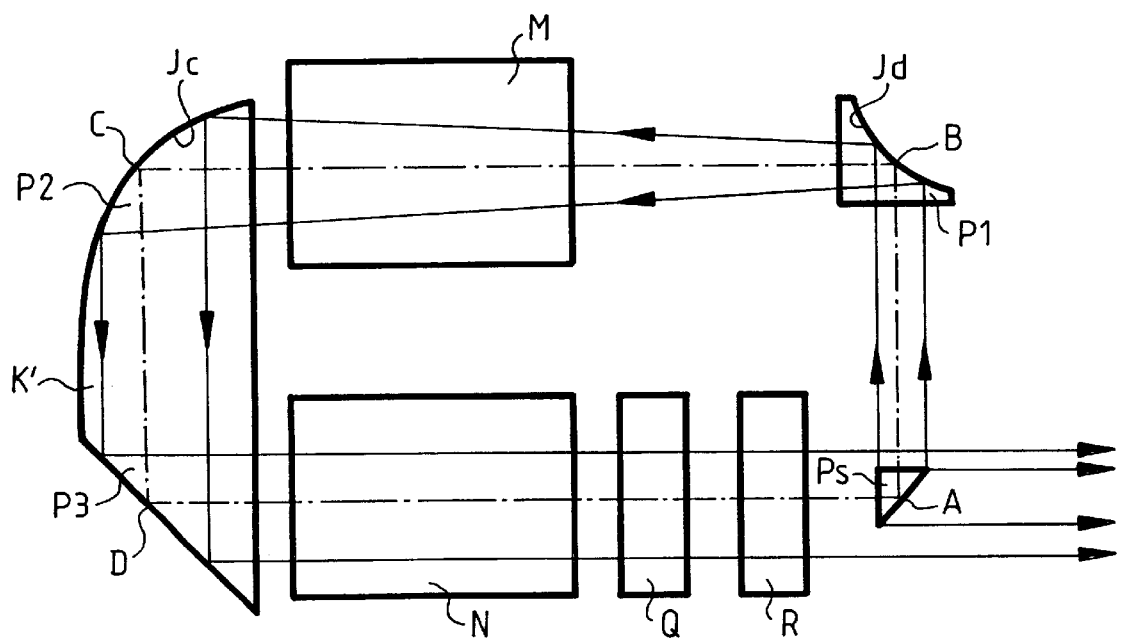
FIG. 4 is a drawing of an alternative to the cavity according to FIG. 2, FIGS. 5 to 7 are drawings of the cavity according to FIG. 1 used as an optical parametrical oscillator.

FIG. 4 shows another variant of the laser cavity according to FIG. 2. In this variant, the plane faces used as reflectors in the prisms P1 and P2 are replaced by spherical faces to respectively form a convex reflector Fd and a concave reflector Fc. These two reflectors form an optical magnification set that replaces the lenses Ld, Lc of the embodiment according to FIG. 2. The elements M, N, Q, R of FIG. 2 are also present in FIG. 4.

FIGS. 5 to 8 are sectional views that show the way in which the unstable cavity according to FIG. 1 can be used to make optical parametrical oscillators or O.P.O. that constitute wavelength-tunable laser sources. The full importance of the fact that the cavity according to FIG. 1 can work in a wide range of wavelengths is seen in this case.

The O.P.O. devices have a manufacturing constraint that does not exist in the laser cavities, namely the coupling of a pump beam Fp in the cavity. The FIGS. 5 to 7 are three diagrams illustrating three different ways of obtaining this coupling of this pump beam.

Figure 5:
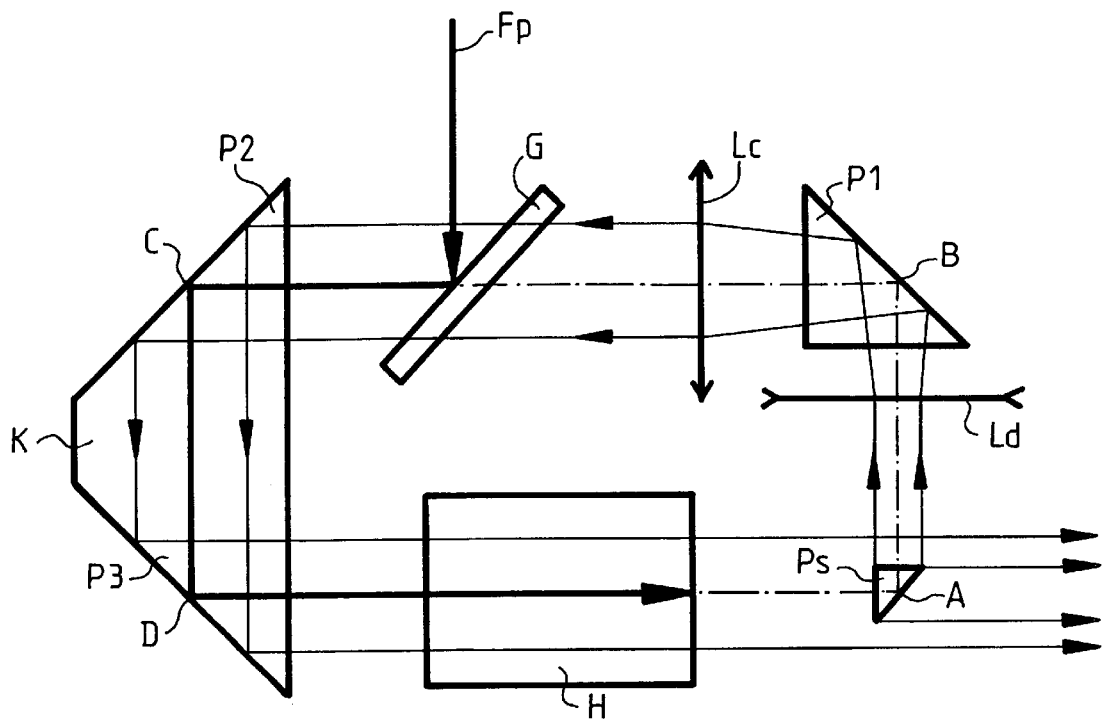

In the embodiment of FIG. 5, a dichroic plate G is inserted between the convergent lens Lc and the prism P2. This plate, tilted at 45° with respect to the section BC, is transparent for the laser beam in the cavity and reflective for the pump beam. The O.P.O. comprises a non-linear crystal H inserted in the section CA and forming the laser medium of the O.P.O.

Figure 6:
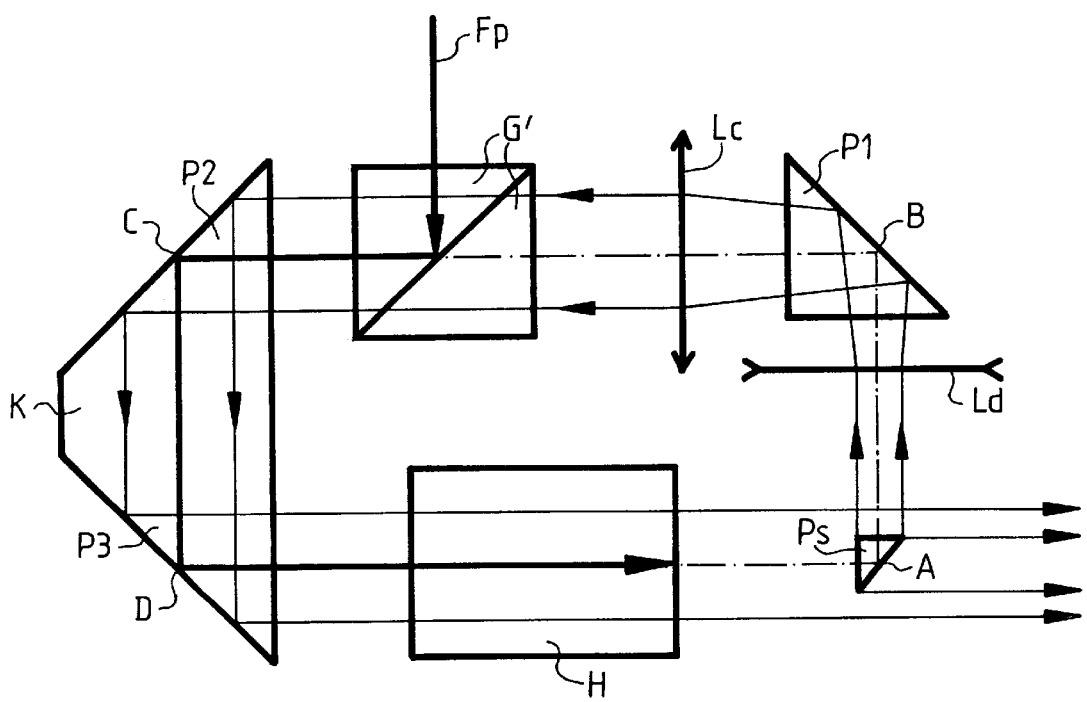

The embodiment according to FIG. 6 corresponds to the one according to FIG. 5 except hat, instead of the dichroic plate G, there is a polarized prism G'. Naturally, in this case, the pump beam should be polarized perpendicularly to the beam created in the cavity.

The embodiment according to FIG. 7 is a variant to the one according to FIG. 6. The polarizer beam G' is withdrawn and the optical block K is replaced by two distinct prisms P2g and P3. The prism P2g is a polarizer prism that fulfils a dual role: coupling the pump beam Fb in the cavity and prompting a deflection of the beam created in the cavity; here too, the pump beam must be polarized perpendicularly to the beam created in the cavity. In this embodiment, the beam created in the cavity is reflected by the separating surface of the polarizer prism. The part of the prism P2g crossed by the beam created in the cavity corresponds to the prism P2 of the optical block K of FIGS. 5 and 6. As for the pump beam it crosses the prism P2g without being deflected.

Figure 8:
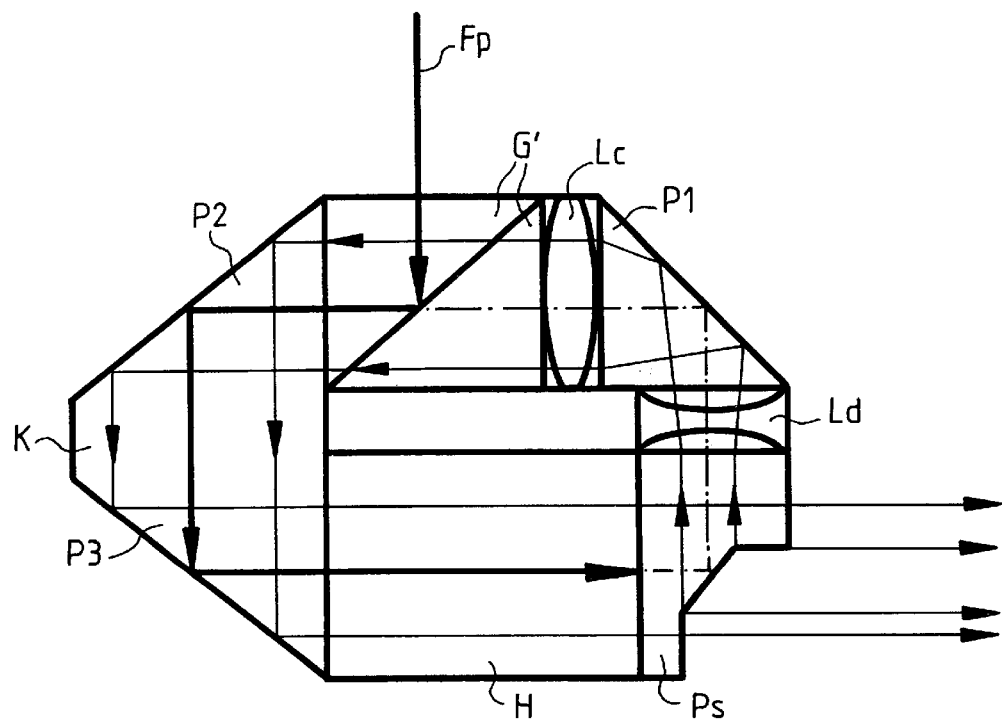
FIG. 8 is a more detailed sectional view of the cavity according to the drawing of FIG. 6.

The cavities according to FIGS. 2 to 7 may be made in compact form as can be seen in FIG. 8 which is a sectional view. This figure gives a more detailed view of the way in which the different elements of the O.P.O. of FIG. 6 are assembled. In this embodiment, the successive elements Ld, P1, Lc, G', K, H, Ps are attached and the output prism Ps consists of an optical block designed to facilitate the assembling. This optical block corresponds to the prism Ps of FIG. 6 on whose two orthogonal faces two parallel face strips would have been placed.

It must be noted that, in an embodiment of this kind, it is difficult to tune the wavelength of the cavity by rotating the crystal H around the axis of the cavity, namely around the section AD. This frequency tuning may, however, be done by modifying the direction of propagation of the pump beam Fp with respect to the input face of the polarizer prism which leads to an identical modification of the pump beam in the non-linear crystal H.

The present invention is not limited to the examples described or mentioned. Thus, in particular, in the cavity the optical path known as the ring path may be obtained with a whole number of deflection beams different from 4 but at least equal to 3.

Similarly, the lenses Ld, Lc, through the use of glasses with different indices of refraction, may be made so as to have plane input and output faces thus making it easier to join them in the cavity. This is furthermore the case for the lenses Lc, Ld of FIG. 8.

It must be noted that, in the cavities, the laser heads with diodes may be reduced to a single laser head and that, for the lenses Ld, Lc, the other constituent elements of the laser cavities may be positioned at different placed in the optical path defined by the deflector prisms.

What is claimed is:

1. An unstable optical cavity for laser beams, comprising:
   at least 3 deflection means for making a beam created in the cavity undergo at least three changes in direction; and
   an optical magnification set disposed among the at least 3 deflecting means,
   wherein the at least 3 deflection means are prisms each of which has an air-glass reflecting interface that provides one of the changes in direction by total reflection,
   wherein a first of the at least 3 prims is positioned at an output of the cavity and has an air-glass reflecting interface with an insufficient size for a total reflection of the beam in the cavity, and remaining ones of the prisms have an air-glass reflecting interface with a sufficient size for a total reflection of the beam in the cavity, and
   wherein the at least 3 prisms are arranged so the beam traverses the first prism, enters a second of the at least 3 prisms and then is totally reflected on the air-glass reflecting interface of the second prism, enters a third of the at least 3 prisms and then is totally reflected on the air-glass reflecting interface of the third prism towards the first prism, a first portion of the beam re-entering the first prism and totally reflecting on the air-glass reflecting interface towards the second prism, thereby forming an optical ring path, and a second portion of the beam reflected from the third prism bypassing the first prism so as to be output from the optical cavity.

2. An unstable optical cavity according to claim 1, wherein the cavity further comprises at least one laser head, with pumping diodes inserted in the optical path for a laser cavity mode.

3. An unstable optical cavity according to claim 2,
   wherein a number of laser heads is at most equal with a number of prisms minus one, and
   wherein a number of prisms corresponding to a number of the laser heads include laser material, and laser diodes associated with the number of prisms corresponding to the number of laser heads perform an optical pumping operation.

4. An unstable optical cavity according to claim 1, wherein two of the at least 3 prisms have reflecting interfaces comprising a mirror that is divergent in one case and convergent in the other, and wherein the optical magnification set includes the reflecting interfaces of the two prisms.

5. An usable optical cavity according to claim 1, further comprising:

optical coupling means; and a non-linear crystal inserted in the optical path, wherein the optical coupling means is designed for a coupling of a pump beam in the cavity.

6. An unstable optical cavity according to claim 5, wherein the optical coupling means comprises a dichroic plate configured to be transparent for the beam created in the cavity and in total reflection for the pump beam.

7. An unstable optional cavity according to claim 5, wherein the optical coupling means comprises a polarizer beam configured to be transparent for the beam created in the cavity and in total reflection for the pump beam.

8. An unstable optical cavity according to claim 7, wherein the optical coupling means comprises one of the at least 3 prisms, this prism being a polarizer prism used in transparency for the pump beam.

9. An unstable optical cavity for laser beams, comprising at least 3 prisms configured to make a beam created in the cavity undergo at least three changes in direction; and an optical magnification set disposed among the at least 3 prisms, wherein each of the at least 3 prisms has an air-glass reflecting interface that provides one of the changes in direction by total reflection, wherein a first of the at least 3 prisms is positioned at an output of the cavity and has an air-glass reflecting interface with an insufficient size for a total reflection of the beam in the cavity, and remaining ones of the prisms have an air-glass reflecting interface with a sufficient size for a total reflection of the beam in the cavity, and wherein the at least 3 prisms are arranged so the beam traverses the first prism, enters a second of the at least 3 prisms and then is totally reflected on the air-glass reflecting interface of the second prism, enters a third of the at least 3 prisms and then is totally reflected on the air-glass reflecting interface of the third prism towards the first prism, a first portion of the beam re-entering the first prism and totally reflecting on the air-glass reflecting interface towards the second prism, thereby forming an optical ring path, and a second portion of the beam reflected from the third prism bypassing the first prism so as to be output from the optical cavity.

10. An unstable optical cavity according to claim 9, wherein the cavity further comprises at least one laser head, with pumping diodes inserted in the optical path for a laser cavity mode.

11. An unstable optical cavity according to claim 10, wherein a number of laser heads is at most equal with a number of prisms minus one, and wherein a number of prisms corresponding to a number of the laser heads include laser material, and laser diodes associated with the number of prisms corresponding to the number of laser heads perform an optical pumping operation.

12. An unstable optical cavity according to claim 9, wherein two of the at least 3 prisms have reflecting interfaces comprising a mirror that is divergent in one case and convergent in the other, and wherein the optical magnification set includes the reflecting interfaces of the two prisms.

13. An unstable optical cavity according to claim 9, further comprising:

an optical coupling unit; and a non-linear crystal inserted in the optical path, wherein the optical coupling unit is configured to couple a pump beam in the cavity.

14. An unstable optical cavity according to claim 13, wherein the optical coupling unit comprises a dichroic plate configured to be transparent for the beam created in the cavity and in total reflection for the pump beam.

15. An unstable optical cavity according to claim 13, wherein the optical coupling unit comprises a polarizer beam configured to be transparent for the beam created in the cavity and in total reflection for the pump beam.

16. An unstable optical cavity according to claim 15, wherein the optical coupling unit has one of the at least 3 prisms being a polarizer prism used in transparency for the pump beam.

* * * * *